United States Patent [19]

Kistenich et al.

[11] Patent Number: 4,842,305
[45] Date of Patent: Jun. 27, 1989

[54] PIPE JOINT CONNECTING PLASTIC PIPES AND PROCESS OF MAKING SUCH JOINT

[75] Inventors: Johann Kistenich, Krems; Christian Völk, St. Poelten, both of Austria

[73] Assignee: Osterreichische Salen-Kunststoffwerk GmbH, Vienna, Austria

[21] Appl. No.: 764,292

[22] Filed: Aug. 9, 1985

[30] Foreign Application Priority Data

Aug. 14, 1984 [EP] European Pat. Off. ....... 84109686.0

[51] Int. Cl.$^4$ .............................................. F16L 47/02
[52] U.S. Cl. ..................................... 285/21; 285/332; 156/274.2; 156/273.9
[58] Field of Search ................ 285/21, 332, 423; 219/544; 156/273.9, 274.2, 379.7

[56] References Cited

U.S. PATENT DOCUMENTS

| | | | |
|---|---|---|---|
| 2,452,219 | 10/1948 | Bergvall et al. | 285/332 X |
| 3,032,870 | 5/1962 | Rohrberg et al. | 285/332 X |
| 3,094,452 | 6/1963 | Riegen et al. | 285/21 X |
| 3,235,289 | 2/1966 | Jones | 285/21 |
| 3,378,672 | 4/1968 | Blumenkranz | 285/21 X |
| 3,422,179 | 1/1969 | Bauer et al. | 285/21 X |
| 3,788,928 | 1/1974 | Wise | 285/21 X |
| 3,943,334 | 3/1976 | Sturm | 285/21 X |
| 3,987,276 | 10/1976 | Vogelsanger et al. | 285/21 X |
| 4,070,044 | 1/1978 | Carrow . | |
| 4,117,311 | 9/1978 | Sturm | 156/379.7 X |
| 4,141,953 | 2/1979 | Kepes et al. . | |
| 4,224,505 | 9/1980 | Sturm | 156/379.7 X |
| 4,266,997 | 5/1981 | Lippera | 156/274.2 X |
| 4,274,662 | 6/1981 | de Groot et al. | 285/21 |
| 4,313,053 | 1/1982 | Sturm | 285/21 X |
| 4,436,987 | 3/1984 | Thalmann et al. | 156/379.7 X |
| 4,436,988 | 3/1984 | Blumerkraz | 285/21 X |
| 4,486,650 | 12/1984 | Bridgstock et al. | 285/21 X |
| 4,530,520 | 7/1985 | Nyffeler et al. | 285/21 |
| 4,602,148 | 7/1986 | Ramsey | 156/273.9 X |
| 4,630,846 | 12/1986 | Nishino et al. | 285/21 |

FOREIGN PATENT DOCUMENTS

| | | |
|---|---|---|
| 1479231 | 3/1969 | Fed. Rep. of Germany . |
| 2207060 | 6/1974 | Fed. Rep. of Germany . |
| 2817243 | 10/1979 | Fed. Rep. of Germany ........ 285/21 |
| 3226575 | 3/1984 | Fed. Rep. of Germany . |
| 3103305 | 6/1984 | Fed. Rep. of Germany . |
| 1214632 | 12/1970 | United Kingdom .................. 285/21 |
| 2135746 | 9/1984 | United Kingdom ............. 156/273.9 |
| 2135747 | 9/1984 | United Kingdom ............. 156/273.9 |

Primary Examiner—Randolph A. Reese
Assistant Examiner—Anthony Knight
Attorney, Agent, or Firm—Kane, Dalsimer, Sullivan, Kurucz, Levy, Eisele and Richard

[57] ABSTRACT

This pipe joint for connecting pipes made of non shrinkable plastics, preferably polybutene, comprises a sleeve body which has a tapered inside surface facing the pipe end and mating the outside surface of the pipe end. The joint is made by the action of heat on the joint-forming region, e.g., by means of a heating element, which is embedded in the sleeve body. This causes a homogeneous joint to be formed between the sleeve body (3) and the pipe ends (1 and 2). To make the joint, the sleeve body is made to have a defined taper on its inside surface. The pipe end to be inserted is made to have a corresponding taper and is inserted into the sleeve body (3) until no clearance has been left between them and an interference fit has been achieved. The heat source is then energized for a defined time so that the inside surface portions of the sleeve and the outside surface portions of the pipe end melt and the materials forming the sleeve body (3) and the pipe ends (1 and 2) form an intimate, homogeneous joint.

13 Claims, 1 Drawing Sheet

PIPE JOINT CONNECTING PLASTIC PIPES AND PROCESS OF MAKING SUCH JOINT

BACKGROUND OF THE INVENTION a. Field of Invention

This invention relates to a pipe joint connecting plastic pipes and to a process of making such joint, particularly a pipe joint connecting non-shrinkable plastic pipes, in which joint the pipe ends, fittings or the like which are connected tightly to each other under the action of heat and in which the joining sleeve consists of a portion of a pipe end or fitting or of a separate member, which surrounds the gap between the two pipe ends or between the pipe end and the spigot end of the fitting.

b. Description of the Prior Art

Such pipe joints are known under the name of shrink joint or welded joint or shrinkable sleeve or (electrically) weldable sleeve for shrinkable thermoplastic plastic pipes. Such joints can be used to connect shrinkable thermoplastic pipes to each other or to fittings etc., in pipe networks by tight joints, which can be handled conveniently. To make the joint, a separate sleeve is provided around the gap between the elements to be joined so that a small clearance is necessarily left between the inside surface of the sleeve and the outside surface of the pipe ends owing to permissible tolerances of the inside diameter of the sleeve and the outside diameter of the pipe. That clearance is either filled with a liquefied hot-melt adhesive, which supplies to the sleeve the heat required to cause the sleeve to shrink and thus to compress the hot-melt adhesive between the pipe end and the sleeve so as to form a tight joint, as has been proposed in German Patent Specification 2207060, of said clearance is used to accommodate the shrinkage of the sleeve, as has been disclosed is Published German Application 1479231, which teaches to use a heating wire, which is provided with dual insulation and heats the clearance to the required welding temperature, and supplies the sleeve with the heat required for shrinking.

Improvements regarding the arrangement and design of the heating wires for such electrically weldable sleeves for joining conduit pipes consisting of shrinkable thermoplastic plastics have been proposed in German Patent Specification 3103305, which teaches to provide a plurality of resistance heating wires disposed close to the inside surface of the sleeve body, and in German Patent 3,226,575 as well as U.S. Pat. No. 3,235,289, which teach to push a welding ring into the clearance left between the sleeve body and the pipe end and to electrically heat said ring so that it fills the clearance and joins the two parts to each other.

In those known pipe joints either a hot-melt adhesive is used, by which the sleeve body is supplied with the heat required for its shrinkage, or such shrinking heat is supplied by an electrically heated heating coil. Said known processes can only be used for connecting shrinkable thermoplastic materials. The types of joints cannot be used at all with different materials or, e.g., where a clearance between the sleeve and the pipe end is to be filled because they are not sufficiently reliable because a snug contact between the hot-melt adhesive and the surface of the tube is not obtained and because there is no shrinking sleeve for applying pressure.

In connection with non-shrinkable thermoplastic plastics such as polybutene it is possible to use only mechanically acting sleeves, which are very expensive and provide the required safety only when used together with additional fittings, or with welded joints, in which either the end faces of the pipe ends to be joined can be heated above the melting temperature and can then be forced against each other to form a butt-welded joint, or one of the ends to be joined can be designed as a socket and the inside surface of the socket and the outside surface of the pipe can be heated, whereafter said surfaces are pushed one over the other. In both cases the parts to be joined must be moved relative to each other during the welding operation and if the pipes are laid in a confined space the space required for that relative movement is often not available.

OBJECTIVES AND SUMMARY OF THE INVENTION

For this reason it is an object of the invention to provide a dense and economical joint between pipes of non-shrinkable thermoplastic plastics, such as polybutene, which joint should be adapted to be made in a simple manner on a building site.

This object is accomplished in accordance with the invention in that the inside surface of the sleeve body surrounding the joint-forming region has a taper which mates a taper of the outside surface of the or each pipe end, a clearance-free interference fit is provided between the sleeve body and the pipe ends, and heat is supplied to establish a homogeneous welded joint between the sleeve body and the pipe end.

A heating element is desirably embedded in the inside surface of the sleeve body.

The electric heating element desirably consists of a resistor.

The resistor desirably consists of an electric heating coil.

The heating element is desirably coated with the material of which the sleeve body and the pipes to be joined are made.

That material desirably consists of polybutene.

In the process of making that pipe joint in accordance with the invention a sleeve body having a defined internal taper is made first and the pipe ends to be joined are formed with a mating taper on their outside peripheral surfaces, and thereafter the pipe end or pipe ends is or are inserted into the sleeve body to such a depth that no clearance is left between them and an interference fit has been obtained, which may be maintained by means of a collet or the like, whereafter a heat source is caused to act on the joint-forming region until a homogeneous joint has been formed between the sleeve and the pipe end or ends.

In accordance with the invention the heat source is permitted to act on the joint-forming region for a defined time.

In accordance with the invention the heat source is disposed outside the sleeve body and is caused to act from the outside on the joint-forming region.

In accordance with the invention the heat source is embedded in the sleeve body.

In accordance with the invention the heat source is disposed in the inside surface of the sleeve opposite to the pipe end to be joined to said body.

The advantages afforded by the invention reside essentially in that pipes, profiled elements or the like made of non-shrinkable plastics, particularly polybutene, can be connected by a dense and homogeneous joint, which will be free of stresses even if the parts to be joined have different manufacturing tolerances.

Another advantage resides in that the joint can readily be made economically and in a simple manner by unskilled labor in building sites, even in narrow trenches.

A further advantage resides in that the sleeve and the pipe ends to be joined consist of the same material to that the entire pipe network can be made of the same material and it is not necessary to use different materials for sleeves and pipes.

BRIEF DESCRIPTION OF THE DRAWINGS

The invention will now be explained more in detail with reference to an illustrative embodiment shown in the drawings.

DETAILED DESCRIPTION OF THE INVENTION

Figure 1:
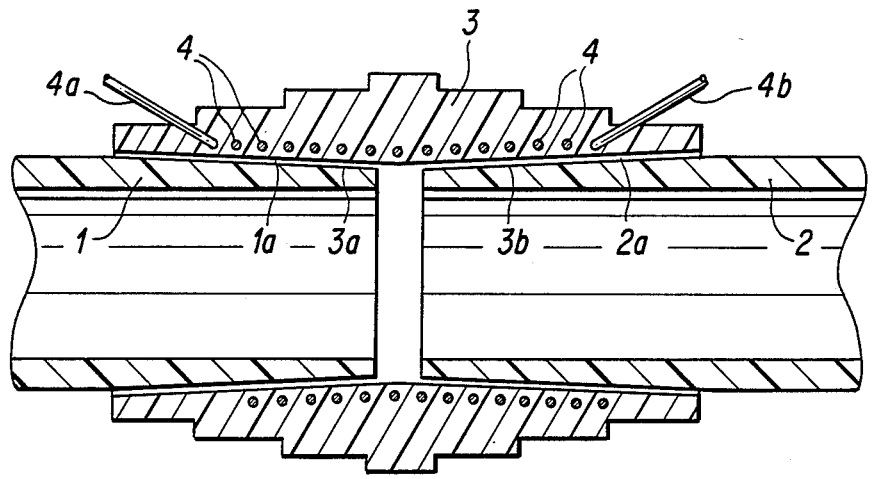
FIG. 1 is a sectional view showing a pipe joint.

The pipe joint shown on the drawings comprises pipe ends 1 and 2, which are surrounded by a sleeve 3. Opposite to the inserted pipe ends 1 and 2, the sleeve body 3 has such a taper with two outwardly flaring side faces 3a and 3b, which extend from the center of the sleeve body. Opposite to said tapered side faces 3a and 3b of the sleeve body 3 the pipe ends 1 and 2 are also provided with tapered surface 1a and 2a. As the pipe ends 1 and 2 are inserted into the sleeve body 3 no clearance is left between the sleeve body 3 and the pipe ends 1 and 2 so that the insertion of the pipe ends results in an interference fit. The tapered side faces 3a and 3b of the sleeve body are provided with a heating element 4 consisting, e.g., of a heating coil. The wire of that heating coil 4 is surrounded by a sheath 4a, which preferably consists of a coating made of the same material as the sleeve body.

The heating element 4 may alternatively consist, e.g., of an embedded network and a suitable coating on the side faces 3a and 3b, or of similar suitable heat sources. Alternatively, external heat sources may be used to act on the joint-forming portions of the sleeve body 3 and the pipe ends 1 and 2. In that case the heating element 4 can obviously be omitted. An induction heating system or the like may also be provided.

Figure 2:
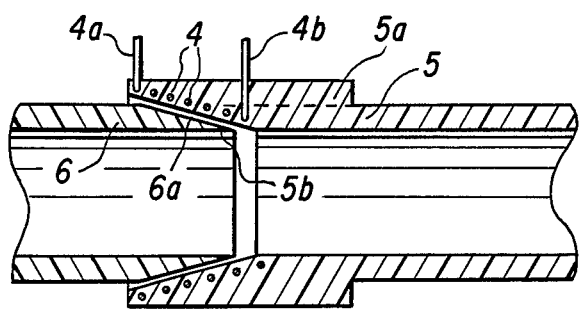
FIG. 2 is a sectional view showing a modification of FIG. 1.

The modification shown in FIG. 2 is a pipe joint comprising pipe end 5 and a sleeve body 5a, which has been attached to or integrally molded with the pipe end 5. Opposite to the inserted pipe end 6, the sleeve body 5a has a tapered side face 5b. The pipe end 6 has a mating taper 6a.

For example a pipe joint for two polybutene pipes with an outside diameter of 90 mm may be made in accordance with this invention as follows:

The sleeve body 3 is originally made in its final shape and with the heating element 4 embedded therein by an injection molding process. The two pipe ends 1 and 2 are provided with tapers 1a and 1b, which correspond to the taper of the sleeve body 3. The length of the tapered portions 3a, 3b and 1a, 2a corresponds to the welding zone having a length of about 37 mm and a taper of 1.6°. The heating element 4 consists of a copper wire, which is 0.6 mm in diameter and coiled circumferentially around the sleeve for a length of 13.2 mm and a resistance R of 0.84 ohms. That wire is coated with polybutene. The pipe ends 1a and 2a are inserted into the sleeve until an interference fit has been obtained. Then a voltage of 24 volts is applied across the ends 4a and 4b of the heating element 4 for 124 seconds so that welding energy amounting to 54,500 joules is supplied to the joint-forming region at an ambient temperature of 20° C. so that the materials of the sleeve body 3 and of the pipe ends 1a and 2a are melted and flow together to constitute a homogeneous and tight joint. When the joint has cooled, it has been completed and is adapted to carry load. The interference fit between the pipe ends 1a and 2a, on the one hand, and the sleeve body 3, i.e., its tapered inside surfaces 3a and 3b, on the other hand, may be upheld by a clamping device during the welding operation and until the joint-forming region has been finally cooled.

We claim:

1. A pipe joint for connecting non-shrinkable plastic pipes with tapered pipe ends comprising:
   a non-shrinkable thermoplastic sleeve body (3) having at least one opening with a tapered shape corresponding to one of said pipe ends to form an interference fit therewith; and
   a heating element (4) imbedded in said sleeve body for heating at least a portion of said sleeve and a pipe end disposed in said opening whereby to melt said portion and said one pipe end so as to flow into contact with each other to form a homogeneous joint.

2. A pipe joint according to claim 1, characterized in that said heating element (4) is embedded in an inside surface of the sleeve body (3).

3. A pipe joint according to claims 1 or 2, characterized in that said heating element (4) consists of an electric heating element.

4. A pipe joint according to claim 3, characterized in that said electric heating element (4) consists of a resistor.

5. A pipe joint according to claim 4, characterized in that said resistor consists of an electric heating coil (4).

6. A pipe joint according to claim 2, characterized in that the heating element (4) is coated with said material of which said sleeve body (3) and said pipes (1, 2) to be joined are made.

7. A process of making a pipe joint, characterized in that a non-shrinkable sleeve body (3) having a sleeve surface defined internal taper (3a, 3b) is made first, non-shrinkable pipe ends (1, 2) to be joined are formed with an outer peripheral surface with a mating taper (1a, 2a), thereafter the tapered pipe end or pipe ends (1, 2) is or are inserted into the sleeve body (3) to such a depth that no clearance is left between the sleeve and the pipe ends and a substantially clearanceless interference fit has been obtained, and a heat source is subsequently caused to act on a joint-forming region of the interference fit until the surfaces of the sleeve and pipe end defining the region have been melted, flow together and form a homogeneous joint.

8. A process according to claim 7, characterized in that said heat source consists of a heating element (4), which is embedded in said sleeve body (3).

9. A process according do claim 8, characterized in that said heating element (4) is provided in the inside peripheral surface of said sleeve body (3) opposite to said pipe ends (1, 2) to be joined to said sleeve body.

10. A pipe joint for connecting the opposed ends of two non-shrinkable thermoplastic pipes to each other, which comprises:

a first non-shrinkable thermoplastic pipe having an open end with a tapered outer periphery, a second non-shrinkable thermoplastic pipe having an open end with a tapered outer periphery, a non-shrinkable thermoplastic sleeve body having openings extending over said open pipe ends, each said opening having a tapered shape corresponding to a tapered outer periphery to form an interference fit therewith, and an electrical heating element imbedded in said sleeve body for heating portions of said sleeve body and corresponding tapered outer peripheries to cause each said portion and a corresponding tapered outer periphery to melt together to form a homogeneous joint.

11. The pipe joint of claim 10, wherein each pipe and the sleeve body are comprised of polybutene.

12. A pipe joint for connecting a non-shrinkable thermoplastic pipe to a fitting, which comprises:

a non-shrinkable thermoplastic pipe having an open end with a tapered outer periphery, a non-shrinkable thermoplastic fitting having an opening extending over said open pipe end, said opening having a tapered shape corresponding to the tapered outer periphery of the pipe to form an interference fit therewith, and an electrical heating element imbedded in said fitting for heating a portion of said fitting and said tapered outer periphery to cause said portion and said tapered outer periphery to melt together to form a homogeneous joint.

13. The pipe joint of claim 12, wherein the pipe and the fitting are comprised of polybutene.

* * * * *